United States Patent
Lewis et al.

(10) Patent No.: US 9,619,239 B2
(45) Date of Patent: Apr. 11, 2017

(54) SYSTEMS AND METHODS FOR PERSISTENT CACHED IMAGE DOWNLOAD

(71) Applicant: Dell Products L.P., Round Rock, TX (US)

(72) Inventors: Jonathan Foster Lewis, Pflugerville, TX (US); Wade Andrew Butcher, Austin, TX (US); William A. Moyes, Austin, TX (US); Philip John Brisky, Manchaca, TX (US)

(73) Assignee: Dell Products L.P., Round Rock, TX (US)

( * ) Notice: Subject to any disclaimer, the term of this patent is extended or adjusted under 35 U.S.C. 154(b) by 137 days.

(21) Appl. No.: 14/481,001

(22) Filed: Sep. 9, 2014

(65) Prior Publication Data

US 2016/0070554 A1    Mar. 10, 2016

(51) Int. Cl.
*G06F 9/44* (2006.01)
*G06F 9/445* (2006.01)

(52) U.S. Cl.
CPC .......... *G06F 9/4401* (2013.01); *G06F 8/665* (2013.01); *G06F 9/4416* (2013.01); *G06F 8/63* (2013.01)

(58) Field of Classification Search
CPC ................................ G06F 9/4416; G06F 8/65
See application file for complete search history.

(56) References Cited

U.S. PATENT DOCUMENTS

| 2005/0010835 A1* | 1/2005 | Childs ............ G06F 11/1456 714/6.12 |
| 2006/0143432 A1* | 6/2006 | Rothman ............ G06F 9/4416 713/2 |
| 2011/0026525 A1* | 2/2011 | He .................... H04L 49/351 370/392 |

* cited by examiner

*Primary Examiner* — Albert Wang
(74) *Attorney, Agent, or Firm* — Jackson Walker L.L.P.

(57) ABSTRACT

In accordance with embodiments of the present disclosure, a device for persistent cached image download may include a memory, an input/output interface, and a network interface. The memory may be configured to store therein an image database, the image database comprising a boot image for each of one or more information handling systems. The input/output interface may be communicatively coupled to the memory and configured to couple to a corresponding input/output port of an information handling system. The network interface may be configured to couple to an image server. In response to an information handling system coupled to the input/output interface determining that the updated version of the particular boot image exists at the image server, the memory may store the updated version in the memory as the particular boot image.

18 Claims, 2 Drawing Sheets

SYSTEMS AND METHODS FOR PERSISTENT CACHED IMAGE DOWNLOAD

TECHNICAL FIELD

The present disclosure relates in general to information handling systems, and more particularly to providing systems and methods for downloading of a persistent cached image.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

During a traditional bare metal provisioning process (e.g., during factory manufacturing) for information handling systems, information handling systems may be required to have an Ethernet interface for performing a Preboot Execution Environment (PXE) boot on "bare metal" information handling systems (e.g., those with no operating system or other software installed). As some customers of information handling systems demand new types of networking devices, a bare metal provisioning process will need to adapt to different information handling system configurations. For example, some customers may desire an information handling system that includes only InfiniBand network interfaces, and installing an InfiniBand network in a factory to service such a market may be cost prohibitive. In addition, bare metal provisioning process that utilize network interfaces for retrieving a boot image may impose large latencies into the bare metal provisioning process as the PXE boot image must download over the factory network. Use of a Universal Serial Bus (USB) network interface may impose even larger latencies.

SUMMARY

In accordance with the teachings of the present disclosure, the disadvantages and problems associated with networking via multiple unique interfaces during bare metal provisioning of an information handling system may be reduced or eliminated.

In accordance with embodiments of the present disclosure, a device for persistent cached image download may include a memory, an input/output interface, a network interface, and a processor. The memory may be configured to store therein an image database, the image database comprising a boot image for each of one or more information handling systems. The input/output interface may be configured to couple to a corresponding input/output port of an information handling system. The network interface may be configured to couple to an image server. The processor may be communicatively coupled to the memory, the input/output interface, and the network interface, and may be configured to determine if an updated version of a particular boot image stored in the image database exists at the image server and, in response to determining that the updated version of the particular boot image exists at the image server, download the updated version from the image server and store the updated version in the memory as the particular boot image.

In accordance with these and other embodiments of the present, a method may include determining if an updated version of a particular boot image stored in an image database of a device for persistent cached image download exists at an image server communicatively coupled to the device, wherein the device comprises an input/output interface configured to couple to a corresponding input/output port of an information handling system. The method may also include, in response to determining that the updated version of the particular boot image exists at the image server, downloading the updated version from the image server and storing the updated version in the memory as the particular boot image.

In accordance with these and other embodiments of the present disclosure, a device for persistent cached image download may include a memory, an input/output interface, and a network interface. The memory may be configured to store therein an image database, the image database comprising a boot image for each of one or more information handling systems. The input/output interface may be communicatively coupled to the memory and configured to couple to a corresponding input/output port of an information handling system. The network interface may be configured to couple to an image server. In response to an information handling system coupled to the input/output interface determining that the updated version of the particular boot image exists at the image server, the memory may store the updated version in the memory as the particular boot image.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
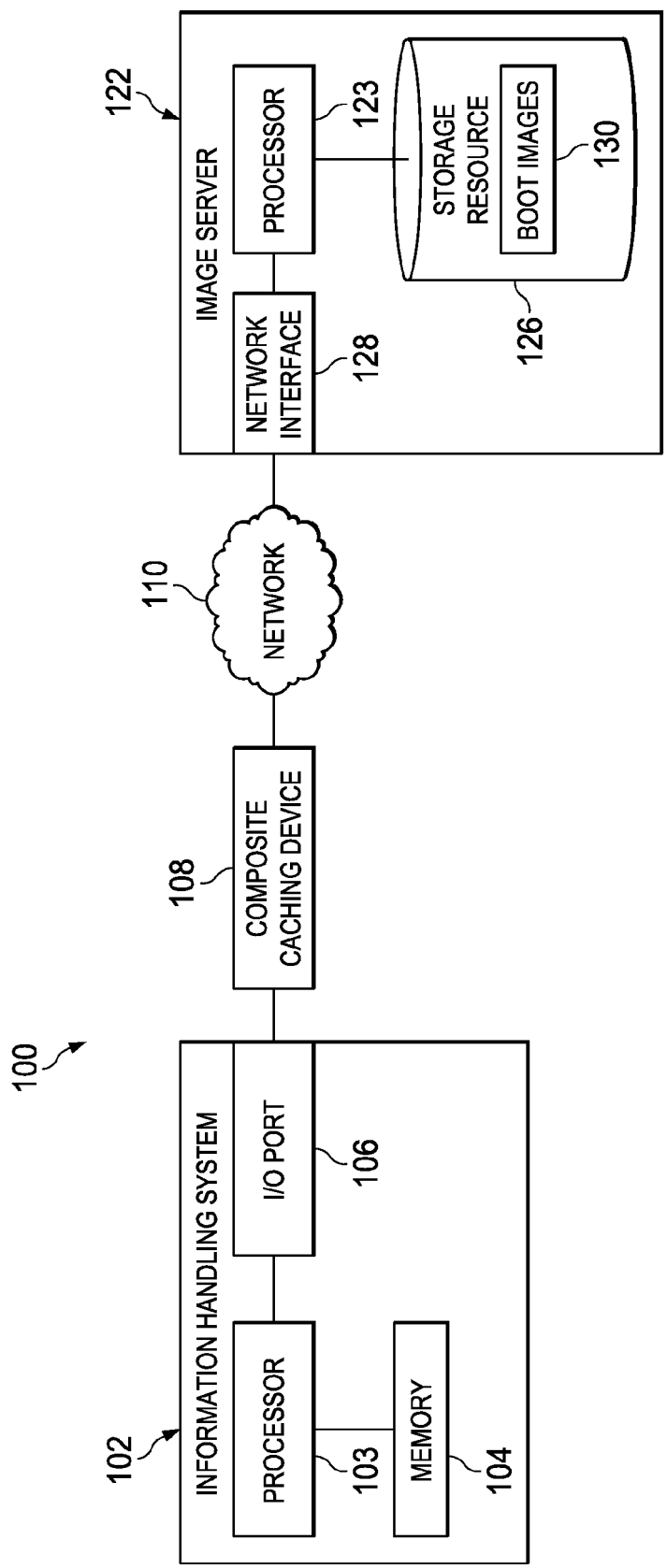
FIG. 1 illustrates a block diagram of an example system for persistent cached image download, in accordance with embodiments of the present disclosure.
Figure 2:
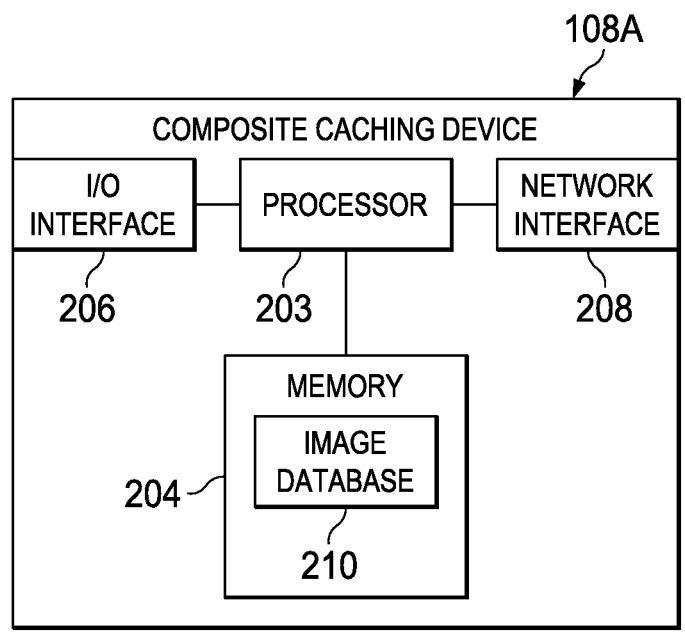
FIG. 2 illustrates a block diagram of an example composite caching device, in accordance with embodiments of the present disclosure.
Figure 3:
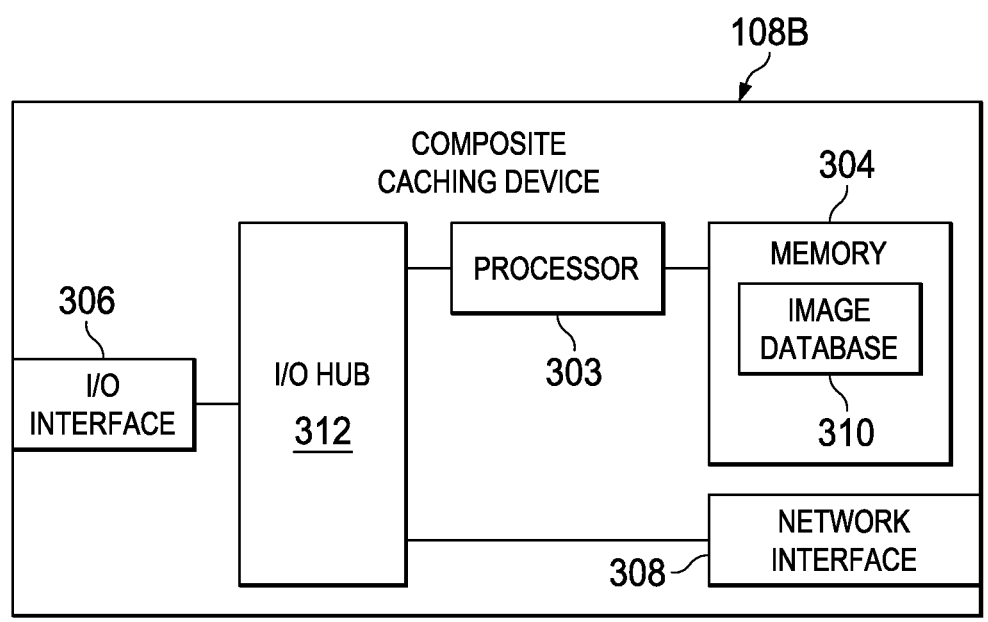
FIG. 3 illustrates a block diagram of another example composite caching device, in accordance with embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example system 100 for persistent cached image download, in accordance with embodiments of the present disclosure. As shown in FIG. 1, system 100 may include an information handling system 102, a composite caching device 108, a network 110, and an image server 122.

In some embodiments, information handling system 102 may be a personal computer. In some embodiments, information handling system 102 may comprise or be an integral part of a server. In other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, and an I/O port 106 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

I/O port 106 may comprise any system, device, and apparatus configured to receive an external device and communicatively couple such external device to processor 103. For example, in some embodiments, an I/O port 106 may comprise a Universal Serial Bus (USB) port having a connector configured to receive a corresponding connector of a USB device (e.g., a USB key drive, thumb drive, or other USB device). In these and other embodiments, an I/O port 106 may comprise any other type of suitable external port (e.g., Serial Advanced Technology Attachment (SATA), serial port, parallel port, etc.) to which any suitable device may be coupled.

Composite caching device 108 may comprise any system, device, or apparatus configured to serve as an interface between an information handling system (e.g., information handling system 102) and an image server 122 in order to facilitate persistent cached image download of boot images 130 from image server 122. In some embodiments represented by FIG. 1, composite caching device 108 may comprise an intelligent dongle including components for physically interfacing between information handling system 102 and network 110 to which image server 122 is coupled. Composite caching device 108 may be implemented in a plurality of topologies, including the topologies discussed below in reference to FIGS. 2 and 3.

Network 110 may be a network and/or fabric configured to communicatively couple information handling systems to one another. In these and other embodiments, network 110 may include a communication infrastructure, which provides physical connections, and a management layer, which organizes the physical connections and information handling systems communicatively coupled to network 110. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 110 may transmit data via wireless transmissions and/or wireline transmissions using any storage and/or communication protocol, including without limitation, Fibre Channel, Frame Relay, Asynchronous Transfer Mode (ATM), Internet protocol (IP), Trivial File Transfer Protocol (TFTP), Dynamic Host Configuration Protocol (DHCP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Image server 122 may comprise an information handling system. In some embodiments, image server 122 may comprise or be an integral part of a server. As depicted in FIG. 1, image server 122 may include a processor 123, a storage resource 126 communicatively coupled to processor 123, and a network interface 128 communicatively coupled to processor 123.

Processor 123 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 123 may interpret and/or execute program instructions and/or process data stored on storage resource 126 and/or another component of image server 122.

Storage resource 126 may include any system, device, or apparatus operable to store data, instructions, or other information processed by and/or to be processed by processor 123. Storage resource 126 may include, for example, network attached storage, one or more direct access storage devices (e.g., hard disk drives), one or more sequential access storage devices (e.g., tape drives), and/or a memory. As shown in FIG. 1, storage resource 126 may have stored thereon one or more boot images 130. Boot images 130 may comprise one or more images, wherein each of such images comprise a set of instructions for booting a "bare-metal" information handling system. For example, in some embodiments, a boot image 130 may comprise a PXE image.

Network interface 128 may comprise any suitable system, apparatus, or device operable to serve as an interface between image server 122 and one or more other information handling systems. Network interface 128 may enable image server 122 to communicate using any suitable transmission protocol and/or standard, including without limitation those protocols and/or standards set forth above with respect to network 110. In these and other embodiments, network interface 128 may comprise a network interface card, or "NIC."

FIG. 2 illustrates a block diagram of an example composite caching device 108A which may be utilized as composite caching device 108 of system 100, in accordance with embodiments of the present disclosure. As shown on FIG. 2, composite caching device 108A may comprise an I/O interface 206 configured to couple to a corresponding I/O port 106 in order to communicatively couple composite caching device 108A to information handling system 102. In some embodiments, I/O interface 206 may comprise a USB interface having a USB male connector configured to mate with a corresponding female connector of I/O port 106. Accordingly, components of composite caching device 108A may be powered from power drawn from I/O port 106. Also as depicted in FIG. 2, composite caching device 108A may include a network interface 208 which may include a suitable connector (e.g., RJ45 connector) for receiving a wire or cable (e.g., an Ethernet cable) for coupling a network (e.g., network 110) to composite caching device 108A. In some embodiments, such a cable may be permanently coupled to composite caching device 108A while in other embodiments, such a cable may be removable from composite caching device 108A. In addition to I/O interface 206 and network interface 208, composite caching device 108A may also include processor 203 and memory 204.

Processor 203 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 203 may interpret and/or execute program instructions and/or process data stored in memory 204 and/or another component of composite caching device 108A. In some embodiments, processor 203 may comprise a special-purpose processor configured specifically for execution of the functionality of composite caching device 108A.

Memory 204 may be communicatively coupled to processor 203 and may include any system, device, or apparatus configured to retain program instructions and/or data for a period of time (e.g., computer-readable media). Memory 204 may include EEPROM, a PCMCIA card, flash memory, magnetic storage, opto-magnetic storage, or any suitable selection and/or array of non-volatile memory that retains data after power to composite caching device 108A is withdrawn. As shown in FIG. 2, memory 204 may have stored therein an image database 210. Image database 210 may include a table, list, map, or other suitable data structure comprising one or more entries, wherein each entry sets forth a unique identifier (e.g., a serial number, service tag number, etc.) for an information handling system, a boot image for such information handling system, and a signature (e.g., checksum, hash, etc.) for such boot image.

Network interface 208 may comprise any suitable system, apparatus, or device operable to serve as an interface between composite caching device 108A and one or more other information handling systems (e.g., image server 122). Network interface 208 may enable composite caching device 108A to communicate using any suitable transmission protocol and/or standard, including without limitation those protocols and/or standards set forth above with respect to network 110. In these and other embodiments, network interface 208 may comprise a NIC. In some embodiments, network interface 208 may not be visible to an information handling system to which composite caching device 108A is coupled, in which case such information handling system may see composite caching device 108A only as a mass data storage device. In other embodiments, processor 203 may include and/or may be capable of accessing computer-readable media including firmware that when executed, permits visibility of network interface 208 to an information handling system to which composite caching device 108A is coupled. When such firmware is present, it may enable to "composite" functionality of composite caching device 108A.

In operation, as discussed in greater detail below, the components of composite caching device 108A may facilitate persistent cached image download of boot images 130 from image server 122 to image database 210, such that an information handling system (e.g., information handling system 102) may boot from an image stored on a composite caching device coupled to such information handling system, rather than booting over a network interface of the information handling system.

FIG. 3 illustrates a block diagram of another example composite caching device 108B which may be utilized as composite caching device 108 of system 100, in accordance with embodiments of the present disclosure. As shown on FIG. 3, composite caching device 108B may comprise an I/O interface 306 configured to couple to a corresponding I/O port 106 in order to communicatively couple composite caching device 108B to information handling system 102. In some embodiments, I/O interface 306 may comprise a USB interface having a USB male connector configured to mate with a corresponding female connector of I/O port 106. Accordingly, components of composite caching device 108B may be powered from power drawn from I/O port 106. Also as depicted in FIG. 3, composite caching device 108A may include a network interface 308 which may include a suitable connector (e.g., RJ45 connector) for receiving a wire or cable (e.g., an Ethernet cable) for coupling a network (e.g., network 110) to composite caching device 108B. In some embodiments, such a cable may be permanently coupled to composite caching device 108B while in other embodiments, such a cable may be removable from composite caching device 108B. In addition to I/O interface 306 and network interface 308, composite caching device 108A may also include processor 303, a memory 304, and an I/O hub 312.

Processor 303 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 303 may interpret and/or execute program instructions and/or process data stored in memory 304 and/or another component of composite caching device 108B. In some embodiments, processor 303 may comprise a special-purpose processor configured specifically for execution of the functionality of composite caching device 108B.

Memory 304 may be communicatively coupled to processor 303 and may include any system, device, or apparatus configured to retain program instructions and/or data for a period of time (e.g., computer-readable media). Memory 304 may include EEPROM, a PCMCIA card, flash memory, magnetic storage, opto-magnetic storage, or any suitable selection and/or array of non-volatile memory that retains data after power to composite caching device 108B is withdrawn. As shown in FIG. 3, memory 304 may have stored therein an image database 310. Image database 310 may include a table, list, map, or other suitable data structure comprising one or more entries, wherein each entry sets forth a unique identifier (e.g., a serial number, service tag number, etc.) for an information handling system, a boot image for such information handling system, and a signature (e.g., checksum, hash, etc.) for such boot image.

Network interface 308 may comprise any suitable system, apparatus, or device operable to serve as an interface between information handling system 102 and one or more other information handling systems (e.g., image server 122). Network interface 308 may enable composite caching device 108B to communicate using any suitable transmission protocol and/or standard, including without limitation those protocols and/or standards set forth above with respect to network 110. In these and other embodiments, network interface 308 may comprise a NIC (e.g., a USB NIC).

I/O hub 312 may be communicatively coupled to I/O interface 306, processor 303, and network interface 308, and may comprise any system, device, or apparatus that expands a single I/O port or interface (e.g., I/O interface 306) into several so that there are more interfaces available for multiple components (e.g., processor 303 and network interface 308) to couple to the single I/O interface. Because I/O hub 312 is coupled to processor 303 and network interface 308, an information handling system to which composite caching device 108B is coupled may have visibility to both processor 103 (and thus may see composite caching device 108B as a mass data storage device) and network interface 308 (such that the information handling system also sees composite caching device 108B as a network interface).

In operation, as discussed in greater detail below, the components of composite caching device 108B may facilitate persistent cached image download of boot images 130 from image server 122 to image database 310, such that an information handling system (e.g., information handling system 102) may boot from an image stored on a composite caching device coupled to such information handling system, rather than booting over a network interface of the information handling system.

For example, upon powering on of a composite caching device 108 (e.g. composite caching device 108A, composite caching device 108B), composite caching device 108 (e.g., in FIG. 2) or information handling system 102 via composite caching device (e.g., in FIG. 3) may communicate (e.g., via TFTP) with image server 122 in order to compare signatures of images stored in its image database (e.g., image database 210, image database 310) to signatures of corresponding boot images 130 stored on image server 122. Matching signatures for an image cached on composite caching device 108 and its corresponding image as stored on image server 122 may indicate that the image has not changed since last downloaded and cached by composite caching device 108. On the other hand, mismatched signatures may indicate that an image has been updated at image server 122 since the image was last downloaded and cached by composite caching device 108, and the cached image present on composite caching device 108 may be outdated. In response to a signature mismatch, composite caching device 108 may download (e.g., via TFTP) an updated image and store it, along with its signature, in the appropriate entry of its image database. In addition, when a specific image is requested (e.g., by information handling system 102 during a boot thereof while information handling system 102 has composite caching device 108 coupled thereto), composite caching device 108 may verify, by comparing signatures of the cached image to the image in image server 122, whether the cached image is outdated, and download the updated image from image server 122 if the cached image is outdated.

During boot of information handling system 102, composite caching device 108 may appear to information handling system 102 as a storage device from which information handling system 102 may boot using a cached image stored on composite caching device 108. Thereafter, composite caching device 108 may then implement a network interface for information handling system 102 via which the information handling system may be tested and/or configured.

Among the advantages of the systems and methods described herein are that boot times for an information handling system in a bare metal provisioning process may be reduced, and that the composite caching device disclosed herein may allow a bare metal provisioning process with information handling systems not including a network interface.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A composite caching device for persistent cached image download comprising an intelligent dongle having:
    a memory configured to store therein an image database, the image database comprising a boot image for each of one or more information handling systems;
    an input/output interface configured to couple to a corresponding external input/output port of a single information handling system at a time and draw power from the corresponding external input/output port to power components of the composite caching device;
    a network interface configured to couple to an image server; and
    a processor communicatively coupled to the memory, the input/output interface, and the network interface, and configured to:
        determine if an updated version of a particular boot image for the single information handling system to which the input/output interface is coupled and stored in the image database exists at the image server; and
        in response to determining that the updated version of the particular boot image exists at the image server, download the updated version from the image server and store the updated version in the memory as the particular boot image.

2. The composite caching device of claim 1, wherein:
    the image database includes, for each boot image stored therein, a corresponding image signature for the boot image; and
    the processor is configured to determine if the updated version of the particular boot image stored in the image database exists at the image server by comparing the image signature stored in the image database and corresponding to the particular boot image to a signature of a corresponding image stored on the image server.

3. The composite caching device of claim 2, wherein the image signature comprises one of a checksum and a hash.

4. The composite caching device of claim 1, wherein the input/output interface is configured to communicate the boot image to an information handling system to which the input/output interface is coupled such that the information handling system may boot from a boot image for the information handling system stored on the device.

5. The composite caching device of claim 1, wherein the device is visible to an information handling system to which the input/output interface is coupled as a network interface for the information handling system.

6. The composite caching device of claim 1, wherein the input/output interface comprises a Universal Serial Bus interface.

7. A method comprising:
    determining if an updated version of a particular boot image stored in an image database of a composite caching device comprising an intelligent dongle for persistent cached image download exists at an image server communicatively coupled to the composite caching device, wherein the composite caching device comprises an input/output interface configured to couple to a corresponding external input/output port of a single information handling system at a time and draw power from the corresponding external input/output port to power components of the composite caching device; and
    in response to determining that the updated version of the particular boot image for the single information handling system to which the input/output interface is coupled and stored exists at the image server, downloading the updated version from the image server and storing the updated version in the memory as the particular boot image.

8. The method of claim 7, wherein:
    the image database includes, for each boot image stored therein, a corresponding image signature for the boot image; and
    the method further comprises determining if the updated version of the particular boot image stored in the image database exists at the image server by comparing the image signature stored in the image database and corresponding to the particular boot image to a signature of a corresponding image stored on the image server.

9. The method of claim 8, wherein the image signature comprises one of a checksum and a hash.

10. The method of claim 7, further comprising communicating, via the input/output interface of the device, the boot image to an information handling system to which the input/output interface is coupled such that the information handling system may boot from a boot image for the information handling system stored on the device.

11. The method of claim 7, further comprising rendering the device visible as a network interface to an information handling system coupled to the input/output interface of the device.

12. The method of claim 7, wherein the input/output interface comprises a Universal Serial Bus interface.

13. A composite caching device for persistent cached image download comprising an intelligent dongle having:
a memory configured to store therein an image database, the image database comprising a boot image for each of one or more information handling systems;
an input/output interface communicatively coupled to the memory and configured to couple to a corresponding external input/output port of a single information handling system at a time and draw power from the corresponding external input/output port to power components of the composite caching device; and
a network interface configured to couple to an image server;
wherein, in response to the single information handling system coupled to the input/output interface determining that the updated version of the particular boot image exists at the image server, the memory stores the updated version in the memory as the particular boot image.

14. The composite caching device of claim 13, wherein the image database includes, for each boot image stored therein, a corresponding image signature for the boot image.

15. The composite caching device of claim 14, wherein the image signature comprises one of a checksum and a hash.

16. The composite caching device of claim 13, wherein the input/output interface is configured to communicate the boot image to an information handling system to which the input/output interface is coupled such that the information handling system may boot from a boot image for the information handling system stored on the device.

17. The composite caching device of claim 13, wherein the device is visible to an information handling system to which the input/output interface is coupled as a network interface for the information handling system.

18. The composite caching device of claim 13, wherein the input/output interface comprises a Universal Serial Bus interface.

* * * * *